(12) United States Patent
Huang et al.

(10) Patent No.: US 11,634,543 B2
(45) Date of Patent: Apr. 25, 2023

(54) POLYIMIDE POLYMER, POLYIMIDE MIXTURE AND POLYIMIDE FILM

(71) Applicant: National Tsing Hua University, Hsinchu (TW)

(72) Inventors: Chien-Ho Huang, Hsinchu (TW); Ying-Ling Liu, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 224 days.

(21) Appl. No.: 17/314,113

(22) Filed: May 7, 2021

(65) Prior Publication Data
US 2022/0056212 A1 Feb. 24, 2022

(30) Foreign Application Priority Data
Aug. 18, 2020 (TW) .................. 109128124

(51) Int. Cl.
*C08G 73/10* (2006.01)
*C08J 5/18* (2006.01)
*C08K 3/36* (2006.01)

(52) U.S. Cl.
CPC ............ *C08G 73/1032* (2013.01); *C08J 5/18* (2013.01); *C08K 3/36* (2013.01); *C08J 2379/08* (2013.01)

(58) Field of Classification Search
CPC ........... C08G 73/10; C08J 5/18; C09D 179/08
See application file for complete search history.

(56) References Cited

U.S. PATENT DOCUMENTS

2021/0061782 A1   3/2021   Liu et al.

FOREIGN PATENT DOCUMENTS

JP   WO 2012091088   *   7/2012
TW       I711608 B       12/2020

OTHER PUBLICATIONS

Wu et al "Utilization of a Meldrum's acid towards functionalized fluoropolymers possessing dual reactivity for thermal crosslinking and post-polymerization modification", Chem. Commun., 2015, 51, 9220-9222, published on Jun. 2015*
Kim et al "Cyclopolymerization To Synthesize Conjugated Polymers Containing Meldrum's Acid as a Precursor for Ketene Functionality", ACS Macro Lett. 2012, 1, 1090-1093, published on Aug. 2012.*
USPTO structure search, Jan. 2023.*

* cited by examiner

*Primary Examiner* — Gregory Listvoyb
(74) *Attorney, Agent, or Firm* — The Webb Law Firm

(57) ABSTRACT

The present disclosure provides a polyimide polymer, which includes a repeating unit represented by formula (I). Formula (I) is defined as in the specification. The present disclosure further provides a polyimide mixture and a polyimide film, wherein the polyimide mixture is prepared by the polyimide polymer, and the polyimide film is prepared by the polyimide mixture.

13 Claims, 14 Drawing Sheets
(1 of 14 Drawing Sheet(s) Filed in Color)

POLYIMIDE POLYMER, POLYIMIDE MIXTURE AND POLYIMIDE FILM

RELATED APPLICATIONS

This application claims priority to Taiwanese Application Number 109128124 filed Aug. 18, 2020, the disclosure of which is hereby incorporated by reference in its entirety.

BACKGROUND OF THE INVENTION

Field of the Invention

The present disclosure relates to a polyimide polymer, a polyimide mixture and a polyimide film. More particularly, the present disclosure relates to a polyimide polymer, a polyimide mixture and a polyimide film which have reactive.

Description of Related Art

Nowadays, the polymers have been widely used in the semiconductor industry, the automotive industry, the photoelectric industry, the biomedical materials, and the communication materials. Therefore, in the field of the polymers, the functional polymers having better physical properties, such as the heat tolerance, the chemical resistance, the plasticity, the low dielectric constant or the low dielectric loss, are more and more needed.

Traditionally, polyimide is formed by polymerizing diamine compound and dianhydride compound to polyamic acid, the polyamic acid is processed by the solution method, and then performing the thermal cyclization to form polyimide. On the other hand, polyamic acid can also form polyimide by the chemical cyclization method. However, due to the limitation of molecular design and chemical reaction, there are few polyimide polymer chains with chemically reactive huge groups.

Therefore, how to develop a novel polyimide polymer to perform the improvement of the polymer structure, so as to obtain the high-performance polymer materials and improve the applicability.

SUMMARY OF THE INVENTION

According to one aspect of the present disclosure, a polyimide polymer is provided. The polyimide polymer includes a repeating unit represented by formula (I):

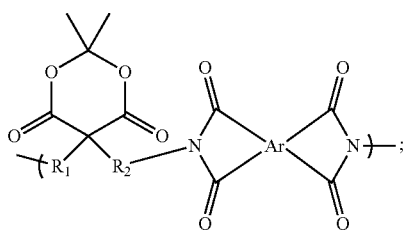

formula (I)

wherein $R_1$ and $R_2$ are the same or different from each other, and are each independently an ether group, an ester group, an amine group or other heteroatom chains, an alkyl group, an alkenyl group, an alkynyl group, an aryl group or other carbon chains, Ar is a tetravalent organic group containing aromatic ring.

According to another aspect of the present disclosure, a polyimide mixture is provided. The polyimide mixture includes a polyimide precursor and a silica containing solution. A polyimide polymer is dissolved in a first organic solvent to obtain the polyimide precursor, and the polyimide polymer includes a repeating unit represented by formula (I):

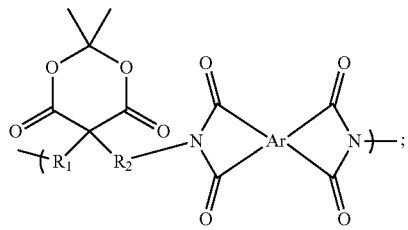

formula (I)

wherein $R_1$ and $R_2$ are the same or different from each other, and are each independently an ether group, an ester group, an amine group or other heteroatom chains, an alkyl group, an alkenyl group, an alkynyl group, an aryl group or other carbon chains, Ar is a tetravalent organic group containing aromatic ring. A plurality of silica particles are dispersed in a second organic solvent to obtain the silica containing solution.

According to further another aspect of the present disclosure, a polyimide film is provided. The polyimide film is obtained by coating the polyimide mixture according to the aforementioned aspect on a substrate and calcining.

BRIEF DESCRIPTION OF THE DRAWINGS

The patent or application file contains at least one drawing executed in color. Copies of this patent or patent application publication with color drawing(s) will be provided by Office upon request and payment of the necessary fee. The present disclosure can be more fully understood by reading the following detailed description of the embodiment, with reference made to the accompanying drawings as follows.

DESCRIPTION OF THE INVENTION

Figure 1:
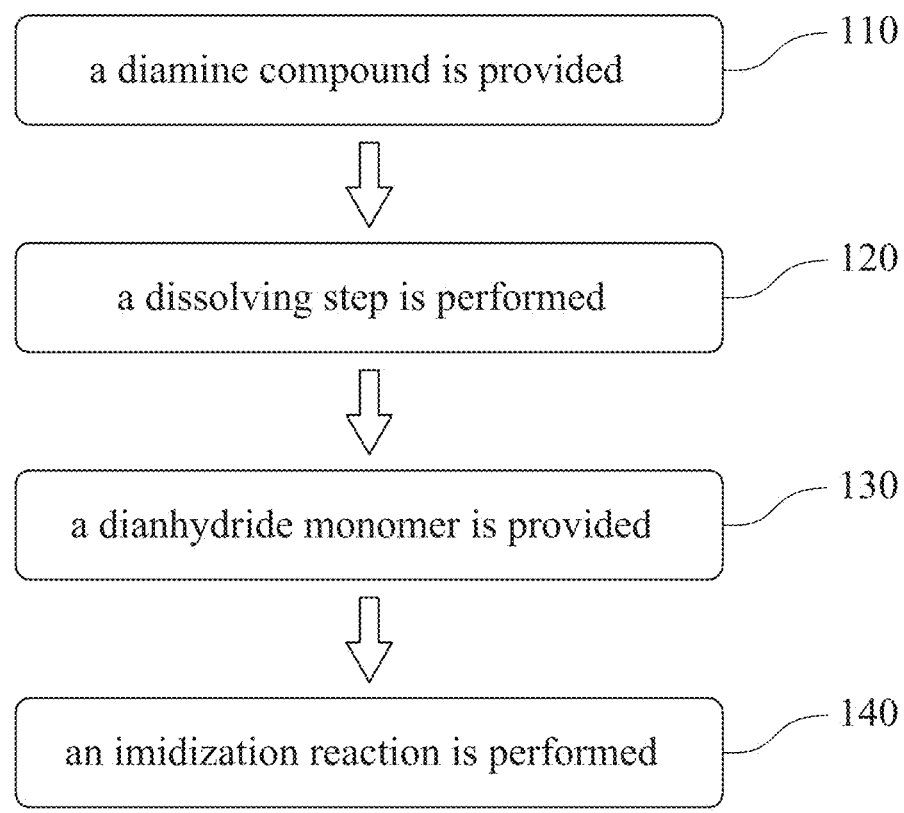
FIG. 1 is a flow chart of a manufacturing method for a polyimide polymer according to one embodiment of the present disclosure.

The present disclosure will be further exemplified by the following specific embodiments. However, the embodiments can be applied to various inventive concepts and can be embodied in various specific ranges. The specific embodiments are only for the purposes of description, and are not limited to these practical details thereof.

In the present disclosure, the compound structure can be represented by a skeleton formula, and the representation can omit the carbon atom, the hydrogen atom and the carbon-hydrogen bond. In the case that the functional group is depicted clearly in the structural formula, the depicted one is preferred.

In the present disclosure, in order to concise and smooth, "polyimide polymer includes a repeating unit represented by formula (I)" can be represented as a polyimide polymer represented by formula (I) or a polyimide polymer (I) in some cases, and the other compounds or groups can be represented in the same manner.

In the present disclosure, if it is not specifically specified whether a certain group is substituted, the group can represent a substituted or an unsubstituted group. For example, "alkyl group" can refer to a substituted or an unsubstituted alkyl.

A Polyimide Polymer

A polyimide polymer is provided of the present disclosure, which includes a repeating unit represented by formula (I):

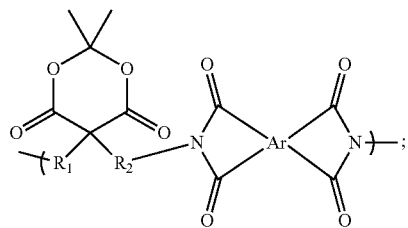

formula (I)

wherein $R_1$ and $R_2$ are the same or different from each other, and are each independently an ether group, an ester group, an amine group or other heteroatom chains, an alkyl group, an alkenyl group, an alkynyl group, an aryl group or other carbon chains, Ar is a tetravalent organic group containing aromatic ring.

With the aforementioned structure, the polyimide polymer of the present disclosure uses a Meldrum's acid structure as a reactive group, which can make the polyimide polymer become chemically reactive and soluble in the organic solvents to perform the processing. Furthermore, the Meldrum's acid structure can be performed a thermal cracking reaction to form a ketene group at a high temperature, so as to perform the subsequent reaction and the self-crosslinking reaction.

Specifically, after the polyimide polymer (I) of the present disclosure is heated, the Meldrum's acid structure will generate the ketene group such as a repeating unit represented by formula (I-1). Afterwards, the ketene group can perform the self-crosslinking reaction such as a repeating unit represented by formula (I-2). Furthermore, the ketene group also reacts with other functional groups, such as the amine group, the alcohol group or the isocyanate group, as a repeating unit represented by formula (I-3), formula (I-4) or formula (I-5), respectively. R' is a specific functional group. It is indicated that the polyimide polymer of the present disclosure has chemical reactivity.

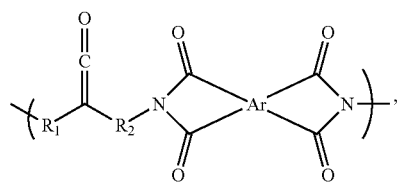

formula (I-1)

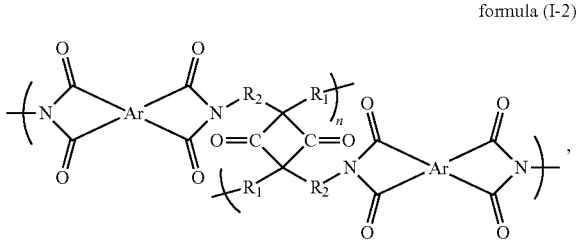

formula (I-2)

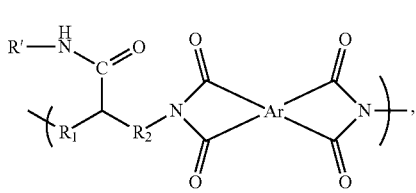

formula (I-3)

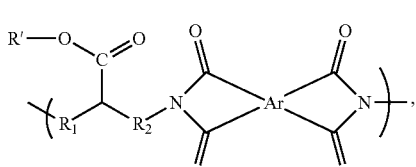

formula (I-4)

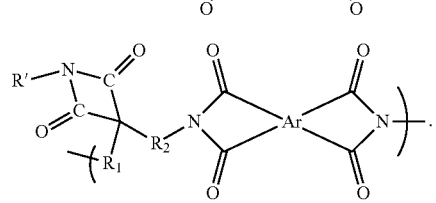

formula (I-5)

According to the aforementioned polyimide polymer (I), $R_1$ and $R_2$ can be but not limited to the benzyl group. Ar can be but not limited to a structure represented by formula (i), formula (ii) or formula (iii):

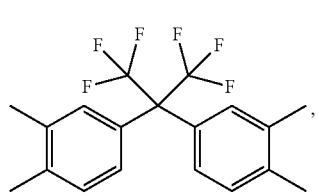

formula (i)

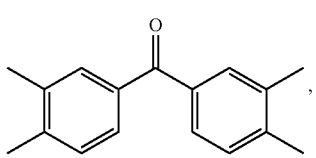

formula (ii)

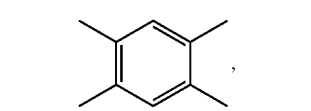

formula (iii)

Specifically, in the formula (I), when $R_1$ and $R_2$ are benzyl groups, and Ar is a structure represented by formula (i), which includes a structure represented by formula (I-AA):

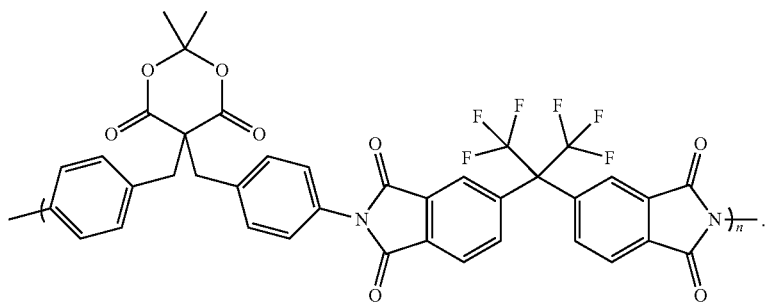

formula (I-AA)

A Manufacturing Method for a Polyimide Polymer

Please refer to FIG. 1, which is a flow chart of a manufacturing method for a polyimide polymer 100 according to one embodiment of the present disclosure. Specifically, the manufacturing method for the polyimide polymer 100 is prepared by the chemical cyclization method. In FIG. 1, the manufacturing method for the polyimide polymer 100 includes a step 110, a step 120, a step 130 and a step 140.

In the step 110, a diamine compound is provided, which includes a structure represented by formula (A):

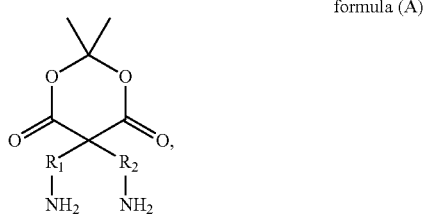

formula (A)

wherein $R_1$ and $R_2$ are the same or different from each other, and are each independently an ether group, an ester group, an amine group or other heteroatom chains, an alkyl group, an alkenyl group, an alkynyl group, an aryl group or other carbon chains.

In the step 120, a dissolving step is performed, wherein the diamine compound (A) is dissolved in an organic solvent to form a first mixture. Specifically, the organic solvent can be but not limited to N,N-dimethylacetamide (DMAc), N,N-dimethylformamide (DMF), N-methyl-2-pyrrolidone (NMP) or N,N-diethylacetamide and other amide solvents. The aforementioned organic solvent can be used for singly or mixing two or more.

In the step 130, a dianhydride monomer is provided, wherein the dianhydride monomer is mixed with the first mixture to form a polyamic acid solution (PAA). Specifically, the dianhydride monomer can be but not limited to tetracarboxylic dianhydride containing aromatic ring. The specific example is 2,2-bis(3,4-anhydrodicarboxyphenyl) hexafluoropropane (6FDA), 3,3',4,4'-benzophenonetetracarboxylic dianhydride (BTDA), pyromellitic dianhydride (PMDA), 3,3',4,4'-biphenyltetracarboxylic dianhydride (BPDA) or 3,3',4,4'-diphenyl ether tetracarboxylic acid dianhydride (ODPA).

In the step 140, an imidization reaction is performed, wherein a dehydrating agent and an imidizing agent are added to the polyamic acid solution, and heated to form the polyimide polymer (I). Specifically, the dehydrating agent can be but not limited to acetic anhydride, propionic anhydride, n-butyric anhydride, benzoic anhydride or trifluoroacetic acid, and the imidizing agent can be but not limited to pyridine, methylpyridine, quinoline or isoquinoline.

Specifically, taking the polyimide polymer (I-AA) for example, the reaction process is shown in Table 1, wherein the diamine compound represented by formula (A-1) is a structure in which $R_1$ and $R_2$ are benzyl groups in formula (A).

TABLE 1

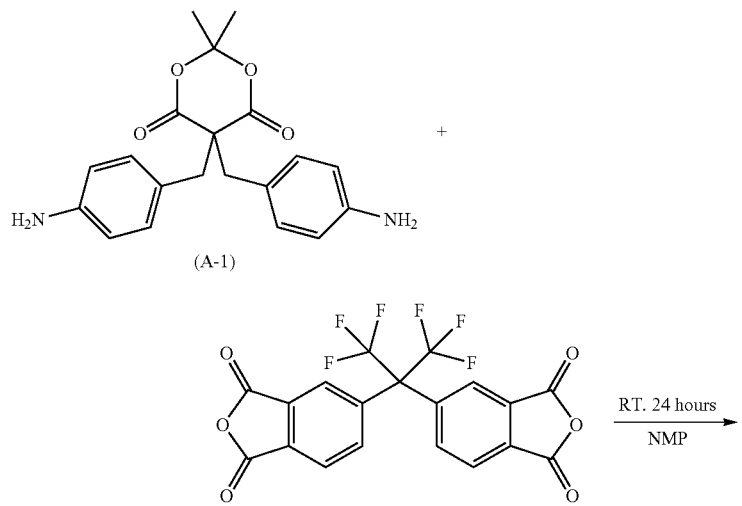

TABLE 1-continued

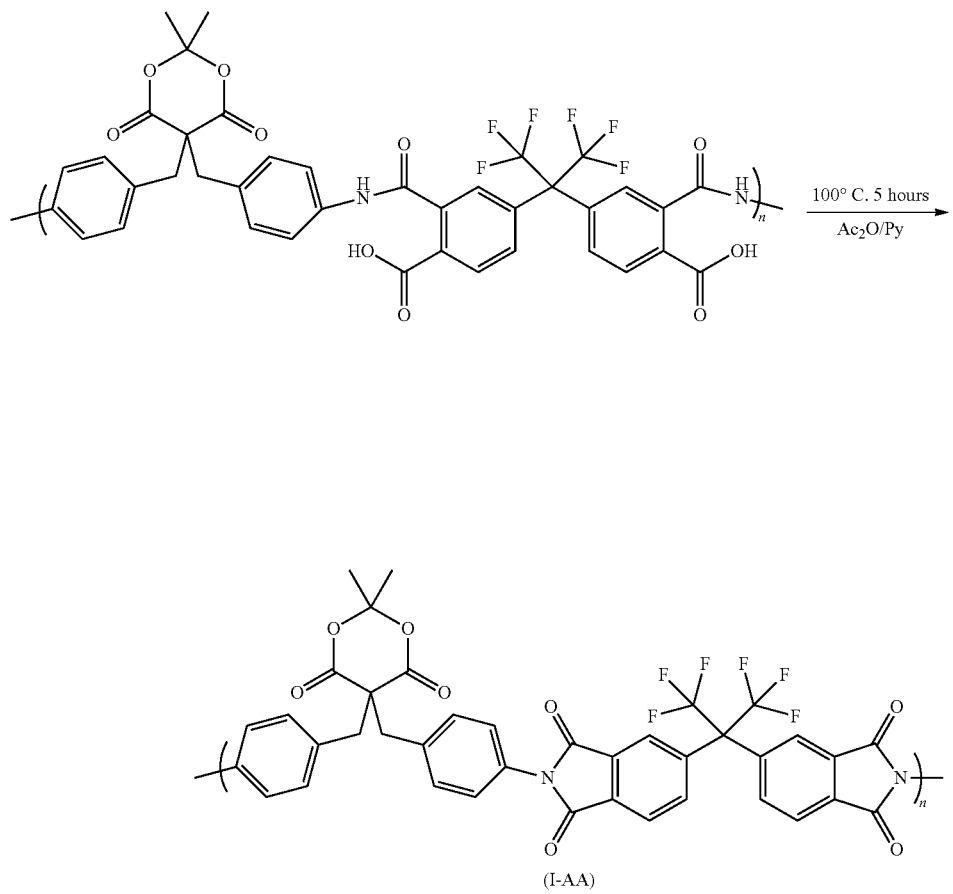

(I-AA)

Polyimide Mixture

A polyimide mixture is provided of the present disclosure. The polyimide mixture includes a polyimide precursor and a silica containing solution. Specifically, the polyimide precursor is obtained by a polyimide polymer dissolved in a first organic solvent, and the polyimide polymer includes a repeating unit represented by formula (I):

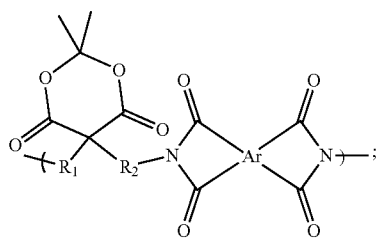

formula (I)

wherein $R_1$ and $R_2$ are the same or different from each other, and are each independently an ether group, an ester group, an amine group or other heteroatom chains, an alkyl group, an alkenyl group, an alkynyl group, an aryl group or other carbon chains, Ar is a tetravalent organic group containing aromatic ring. The first organic solvent can be but not limited to N,N-dimethylacetamide (DMAc), N,N-dimethylformamide (DMF), N-methyl-2-pyrrolidone (NMP) or N,N-diethylacetamide and other amide solvents. The aforementioned first organic solvent can be used for singly or mixing two or more. The polyimide polymer (I) can refer to the aforementioned paragraph, and will not be described herein.

In the present disclosure, the polyimide mixture is obtained by mixing the aforementioned polyimide precursor and the silica containing solution, wherein the silica containing solution is prepared by a plurality of silica particles dispersed in a second organic solvent. Based on a total weight of the polyimide polymer and the silica particles, a content of the silica particles is greater than 0 wt % and less than or equal to 40 wt %. The second organic solvent of the present disclosure is selected from alcohols, ketones, ethers, esters or mixture thereof. Preferably, the second organic solvent can be but not limited to methyl isobutyl ketone (MIBK). Furthermore, after the polyimide mixture of the present disclosure is heated, the polyimide mixture also can perform the self-crosslinking reaction.

Polyimide Film

A polyimide film is provided of the present disclosure. The polyimide film is obtained by coating the aforementioned polyimide mixture on a substrate and calcining. In the present disclosure, the polyimide film is made by blending silica into the polyimide polymer, wherein the polyimide film includes a structure represented by formula (II):

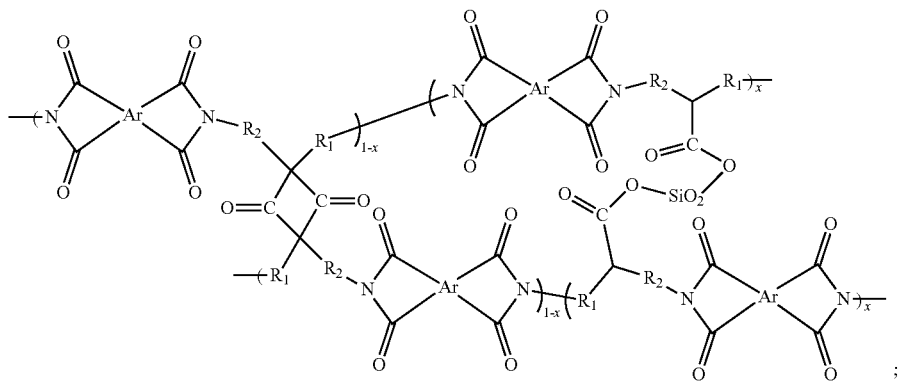

formula (II)

wherein $R_1$ and $R_2$ are the same or different from each other, and are each independently an ether group, an ester group, an amine group or other heteroatom chains, an alkyl group, an alkenyl group, an alkynyl group, an aryl group or other carbon chains, x is greater than 0 and less than 1, Ar is a tetravalent organic group containing aromatic ring which includes a structure represented by formula (i), formula (ii) or formula (iii):

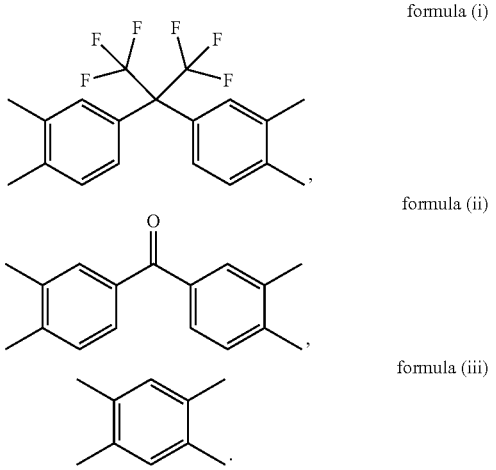

formula (i)

formula (ii)

formula (iii)

Specifically, the coating method of the polyimide mixture can be but not limited to the conventional coating method, such as the knife coating method, the spin coating method, the roller coating method and the slit coating method. The substrate can be but not limited to the fabric, the copper foil, the plastic and the glass.

The present disclosure will be further exemplified by the following specific embodiments so as to facilitate utilizing and practicing the present disclosure completely by the people skilled in the art without over-interpreting and over-experimenting. However, the readers should understand that the present disclosure should not be limited to these practical details thereof, that is, these practical details are used to describe how to implement the materials and methods of the present disclosure and are not necessary.

Example

Example 1 of the present disclosure is the polyimide polymer (I-AA). The synthesis method is to put 3 g (8.465 mmole) of the diamine compound (A-1) and 35 mL of dry NMP in a 100 mL two-necked round-bottom flask. The inlet and outlet of the two-necked round-bottom flask is equipped with a condenser and nitrogen, respectively. The two-necked round-bottom flask is placed on a magnetic stirrer, and stirred at 25° C. until completely dissolved. Next, adding 3.76 g (8.465 mmole) of 4,4'-(hexafluoroisopropylidene) diphthalic anhydride (6FDA), and after reacting at the room temperature for 24 hours to form a polyamic acid. Afterward, adding 4.32 g (42.325 mmole) of acetic anhydride ($AcO_2$) and 3.348 g (43.325 mmole) of pyridine to perform the imidization reaction. The above solution is stirred for 2 hours at the room temperature, and then heated in an oil bath at 100° C. for 5 hours under nitrogen atmosphere. After cooling, the above solution is poured into 1 L of methanol with constant stirring to produce a precipitate, and the precipitate is collected by the filtration and dried under vacuum to obtain the polyimide polymer (I-AA).

Figure 2A:
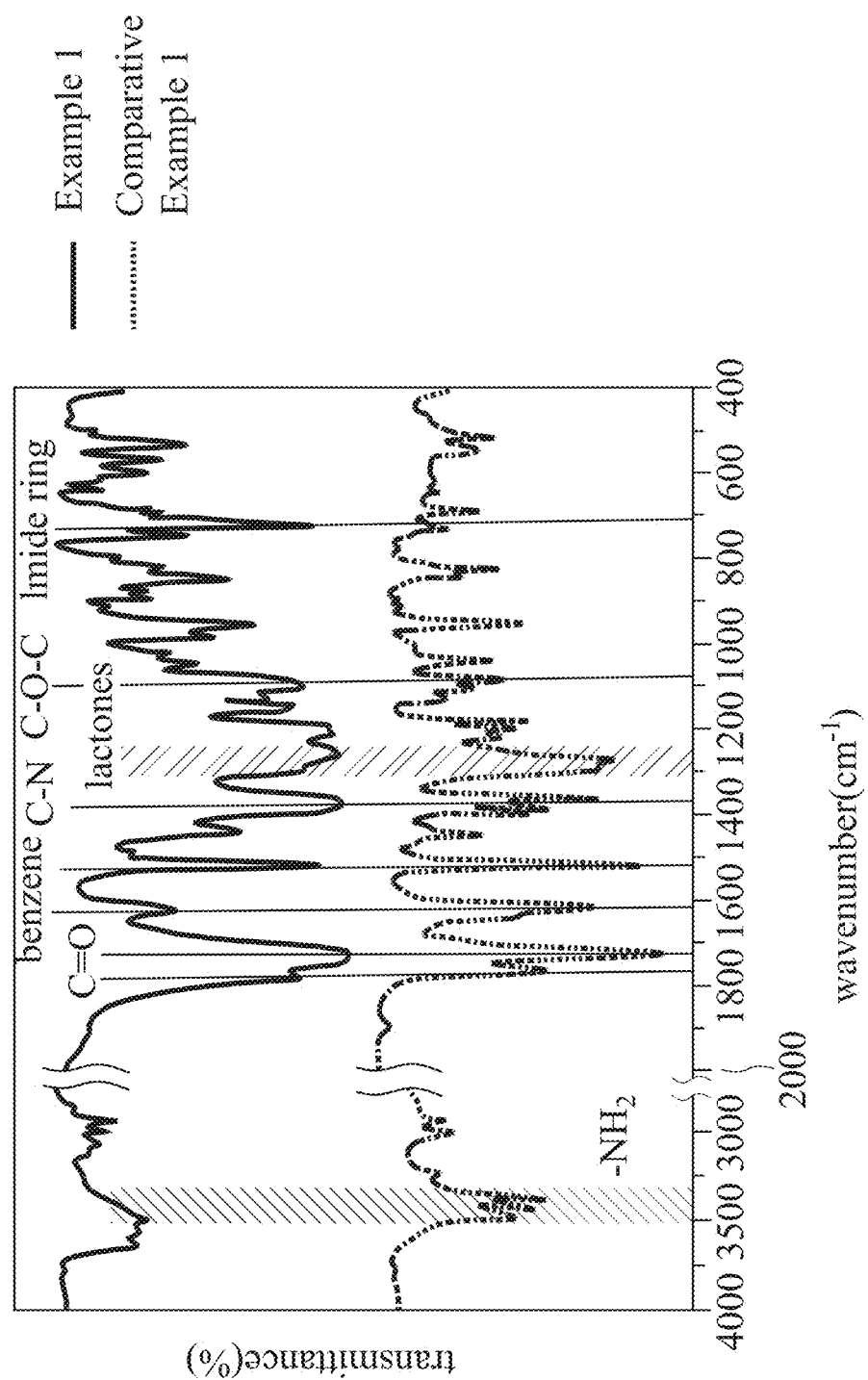
FIG. 2A is a FTIR spectrum of Example 1 and Comparative Example 1.
Figure 2B:
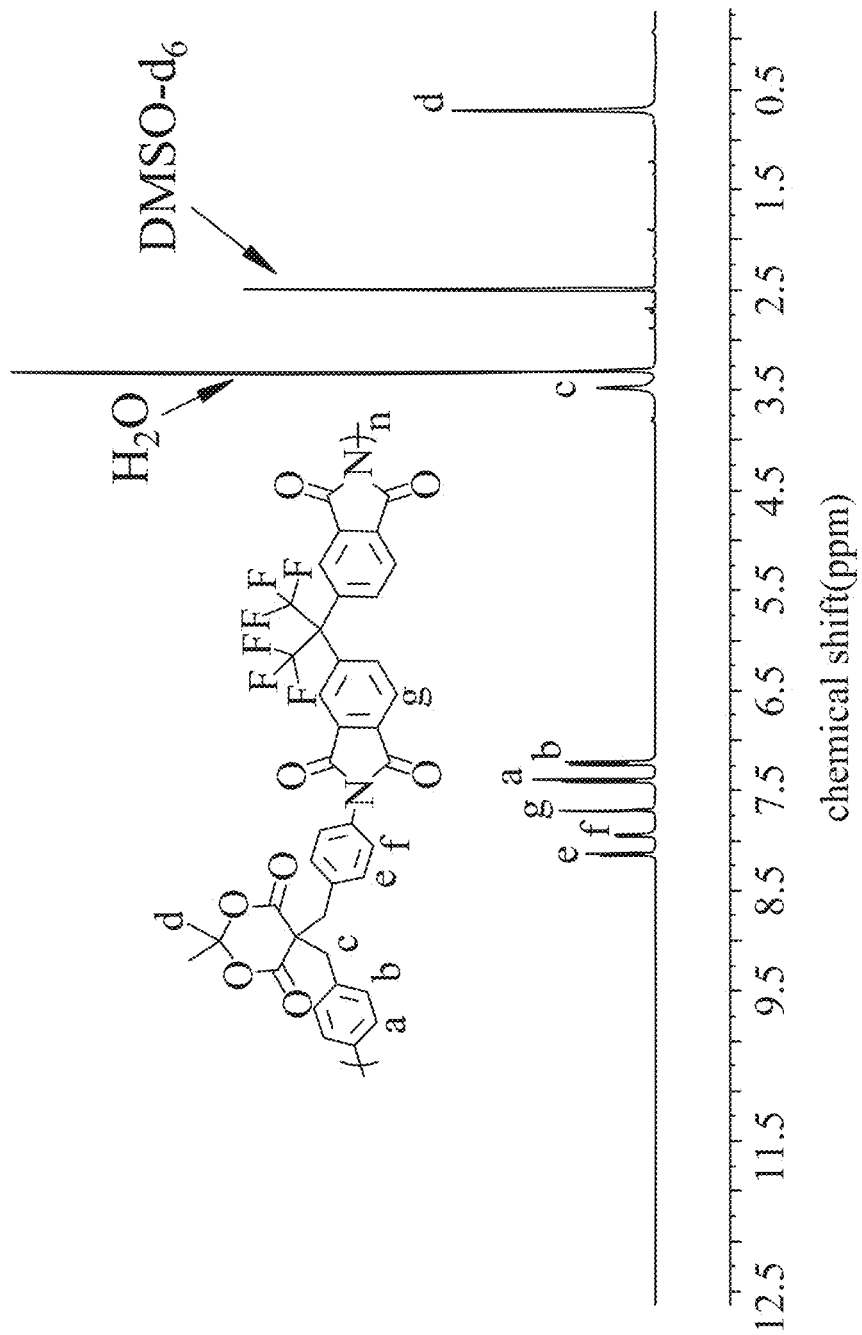
FIG. 2B is a $^1$H-NMR spectrum of Example 1.
Figure 2C:
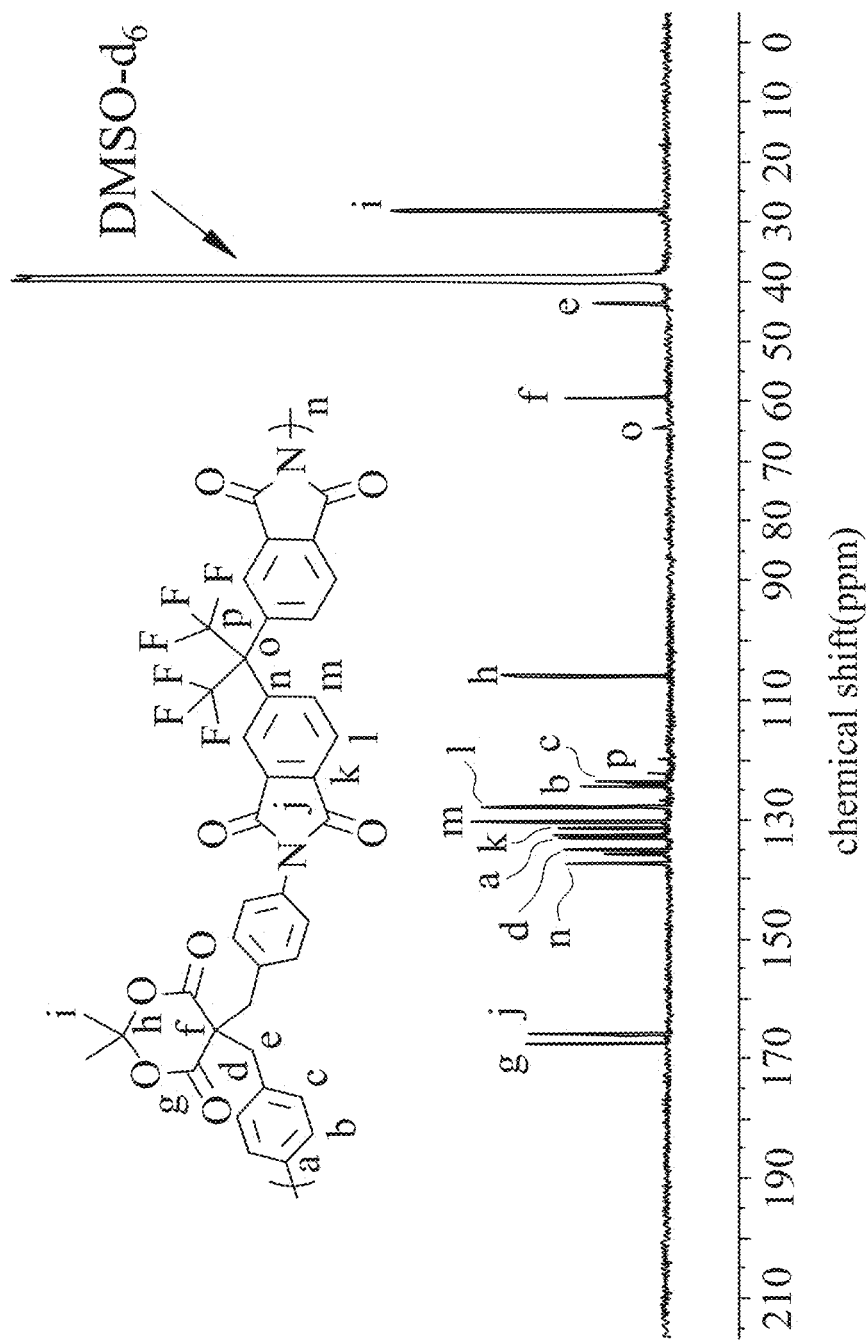
FIG. 2C is a $^{13}$C-NMR spectrum of Example 1.
Figure 2D:
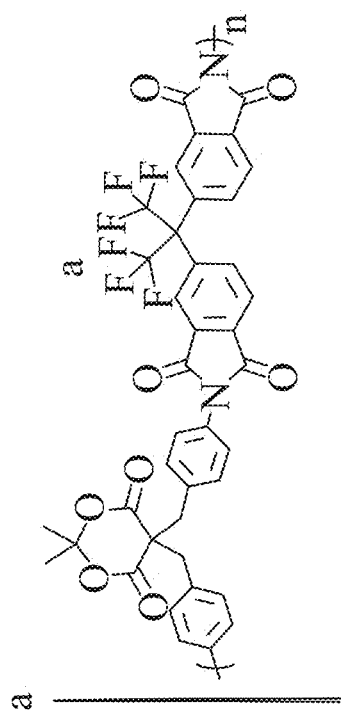
FIG. 2D is a $^{19}$F-NMR spectrum of Example 1.
Figure 2D:
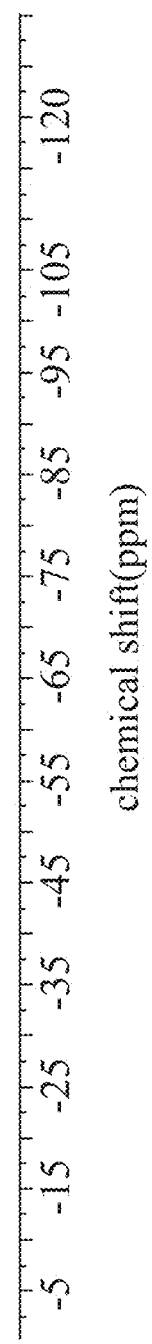

Example 1 is analyzed by FTIR analysis, $^1$H-NMR analysis, $^{13}$C-NMR analysis, and $^{19}$F-NMR analysis, so as to confirm the structure of Example 1. Please refer to FIGS. 2A, 2B, 2C and 2D. FIG. 2A is a FTIR spectrum of Example 1 and Comparative Example 1. FIG. 2B is a $^1$H-NMR spectrum of Example 1. FIG. 2C is a $^{13}$C-NMR spectrum of Example 1. FIG. 2D is a $^{19}$F-NMR spectrum of Example 1. As known in FIGS. 2A to 2D, it can be confirmed that the product of Example 1 is the polyimide polymer (I-AA), wherein Comparative Example 1 is the diamine compound (A-1).

The preparation method of the polyimide film of Example 2 to Example 4 of the present disclosure is to dissolve 1 g of the polyimide polymer (I-AA) of Example 1 in 5.6 mL of NMP solvent. Next, adding the silica containing solution to form the polyimide mixture. Then, the polyimide mixture is casted on the glass plate by 200 μm scraper, and heated to 120° C. by the vacuum oven for 3 hours, then heated at 180° C., 200° C., 240° C. and 280° C. for 1 hour, respectively, and heated at 300° C. for 30 minutes, so as to obtain the polyimide film of Example 2 to Example 4. The difference between Example 2 to Example 4 is that an amount of silica particles added to the polyimide mixture. Based on a total weight of the polyimide polymer and the silica particles, an amount of the silica particles of Example 2 is 20 wt %, an amount of the silica particles of Example 3 is 30 wt %, and an amount of the silica particles of Example 4 is 40 wt %.

Figure 3:
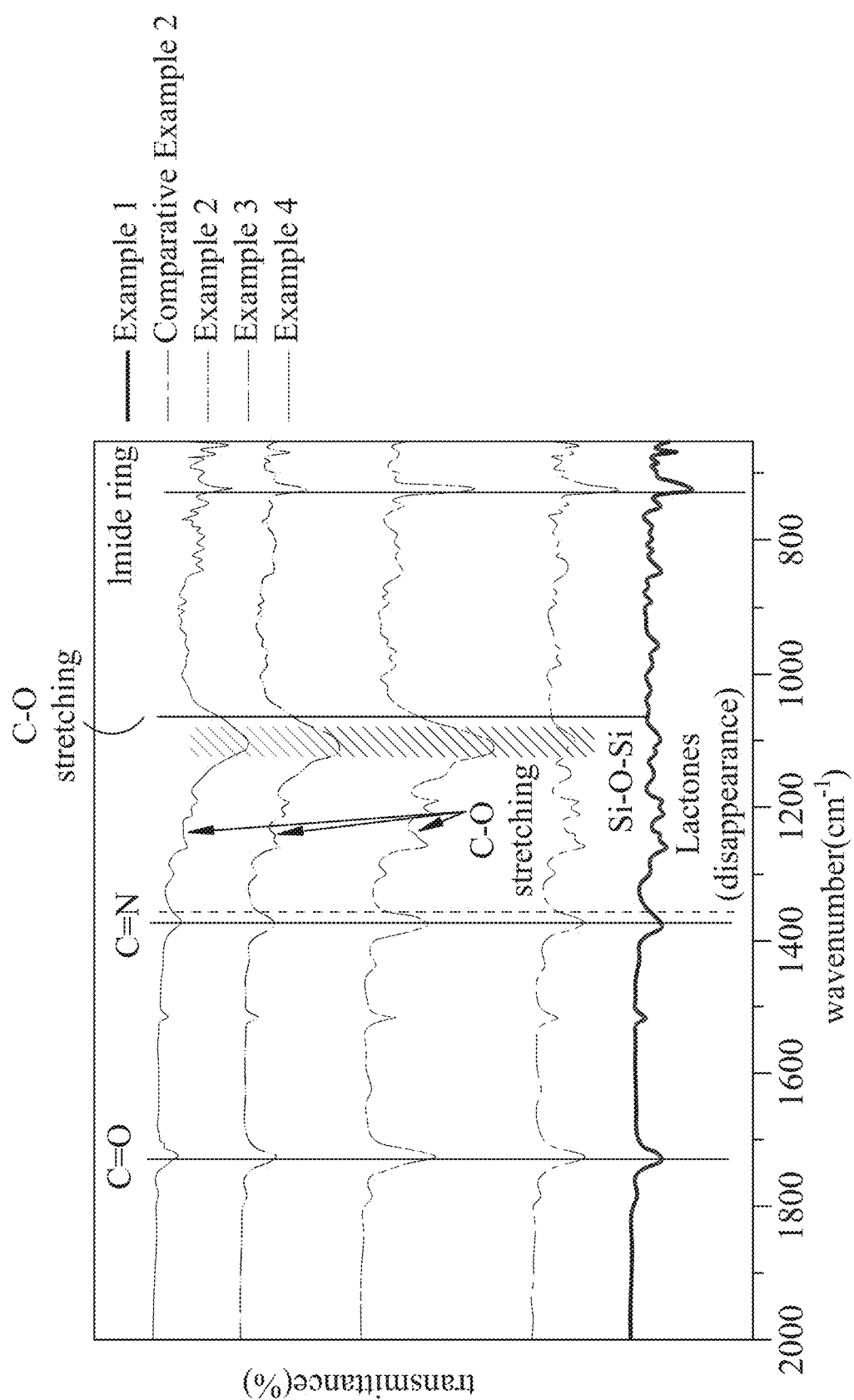
FIG. 3 is an ATR-FTIR spectrum of Example 1 to Example 4 and Comparative Example 2.
Figure 4:
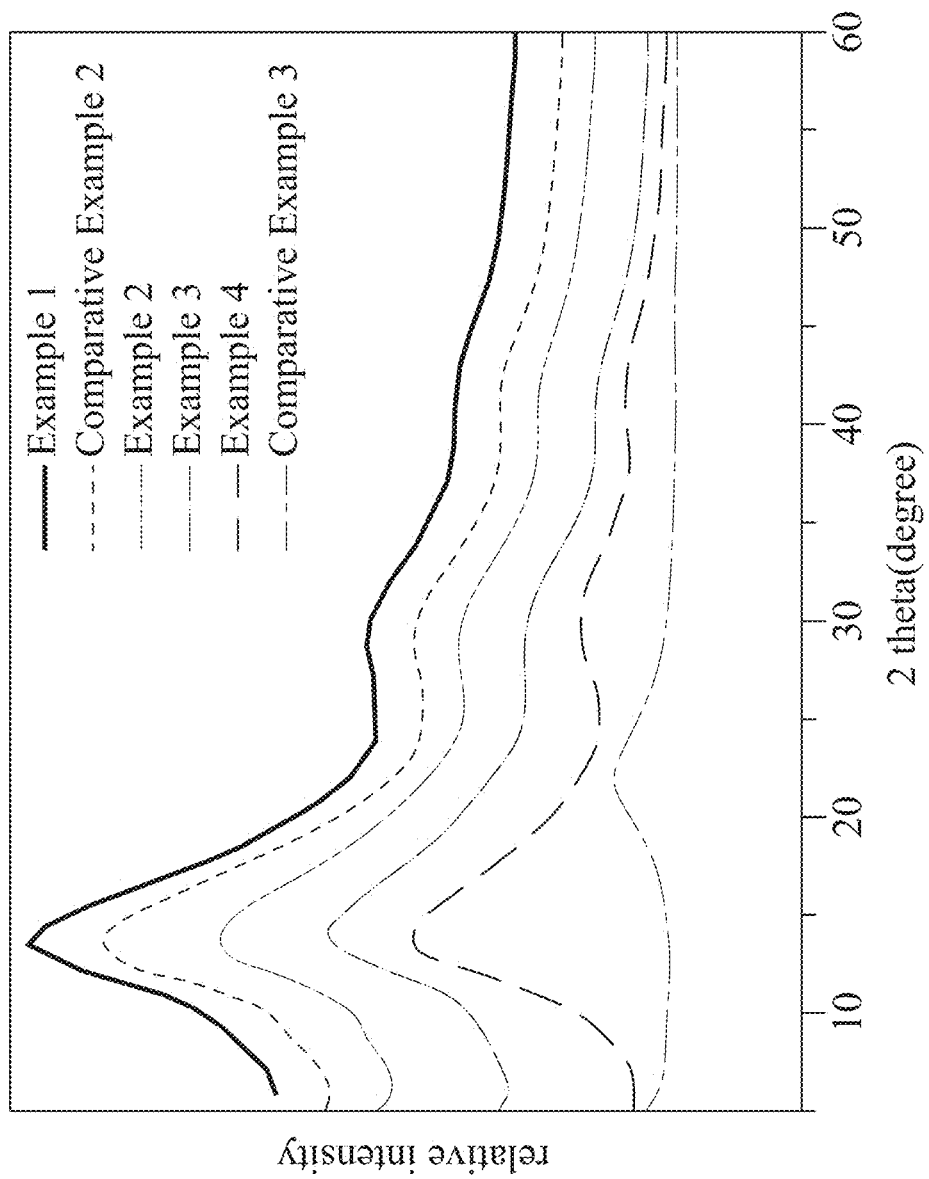
FIG. 4 is a XRD spectrum of Example 1 to Example 4 and Comparative Example 2 to Comparative Example 3.

Example 2 to Example 4 is analyzed by ATR-FTIR analysis and XRD analysis, so as to confirm the structure of Example 2 to Example 4. Please refer to FIGS. 3 and 4, wherein FIG. 3 is an ATR-FTIR spectrum of Example 1 to Example 4 and Comparative Example 2. FIG. 4 is a XRD spectrum of Example 1 to Example 4 and Comparative Example 2 to Comparative Example 3. Comparative Example 2 is a film after heats Example 1, and Comparative Example 3 is silica.

First, it can be observed that the characteristic peak (1337 cm$^{-1}$) of the Meldrum's acid lactone structure of Example 2 to Example 4 and Comparative Example 2 in the result of FIG. 3 is disappeared, proving that the ring-opening reaction of Meldrum's acid occurs. Furthermore, it can be observed that the changes caused by the reaction of the Meldrum's acid and silica in the analysis results of Example 2 to Example 4. The newly formed C—O stretching (1250 cm$^{-1}$, 1050 cm$^{-1}$) can prove the progress of the nucleophilic addition reaction is performed between the ketone group and the hydroxyl group. Moreover, in Example 2 to Example 4, in addition to the characteristic peak on the imide structure, such as the imide ring (741 cm$^{-1}$), C—N stretching (1364 cm$^{-1}$) and C═O asymmetrical and symmetrical stretching (1779 cm$^{-1}$, 1724 cm$^{-1}$) can be observed, the Si—O—Si structural characteristics (1100 cm$^{-1}$) of silica can still be observed, so as confirm the product of Example 2 to Example 4 is the polyimide film doped with silica.

Furthermore, according to the broad peak) (2θ=9°~24°) shown in FIG. 4, it can be seen that the prepared polyimide films are all amorphous. The d-spacing can be calculated by Bragg's equation: 2d×sin θ=nλ. The maximum diffraction peak 2θ of the film is about 13.43°~13.79°, and the calculated d-spacing is about 6.59 Å~6.42 Å, which indicates that this type of the polyimide film material exhibits more than twice the d-spacing than the Kapton (d=3 Å). Moreover, the diffraction value of Comparative Example 3 is about 22.08°, the d-spacing of Comparative Example 3 is about 4.03 Å, and the diffraction peak is not appeared obviously in this region in Example 2 to Example 4. It is proved that the silica particles are dispersed uniformly between the molecular chains. According to the difference of d-spacing of Comparative Example 2 and Example 2 to Example 4 shows that the addition of silica can indeed create a larger space in the molecular chain to improve the free volume of the material. The measurement results of the diffraction angle (2θ) and d-spacing (d) of Example 1 to Example 4 and Comparative Example 2 to Comparative Example 3 are shown in Table 2.

TABLE 2

|  | 2θ (degree) | d (Å) |
| --- | --- | --- |
| Example 1 | 13.43 | 6.59 |
| Example 2 | 13.66 | 6.48 |
| Example 3 | 13.51 | 6.55 |
| Example 4 | 13.55 | 6.53 |
| Comparative Example 2 | 13.79 | 6.42 |
| Comparative Example 3 | 22.08 | 4.03 |

Thermal Property Measurement

Example 1 to Example 4 and Comparative Example 2 are performed the thermal property evaluation. The thermal property evaluation methods include thermogravimetric analysis (TGA) and dynamic mechanical analysis (DMA).

Figure 5A:
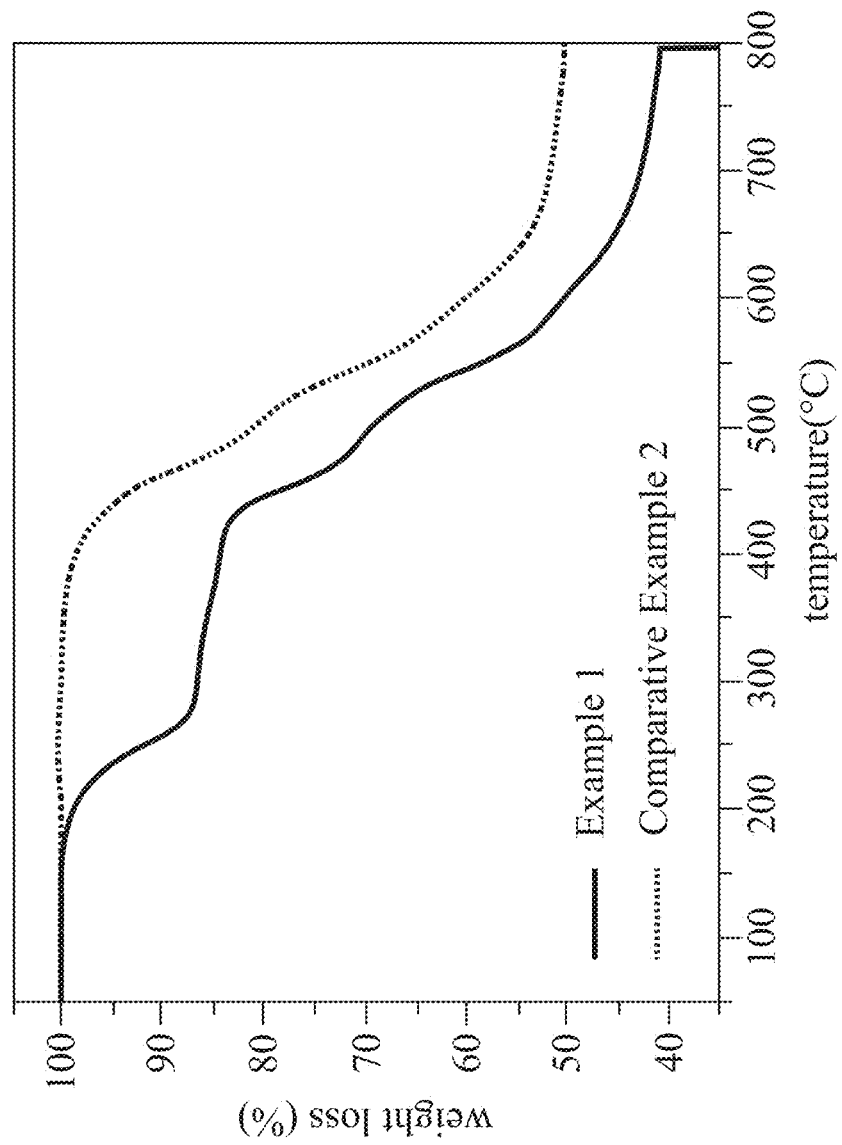
FIG. 5A is a TGA thermogram of Example 1 and Comparative Example 2.
Figure 5B:
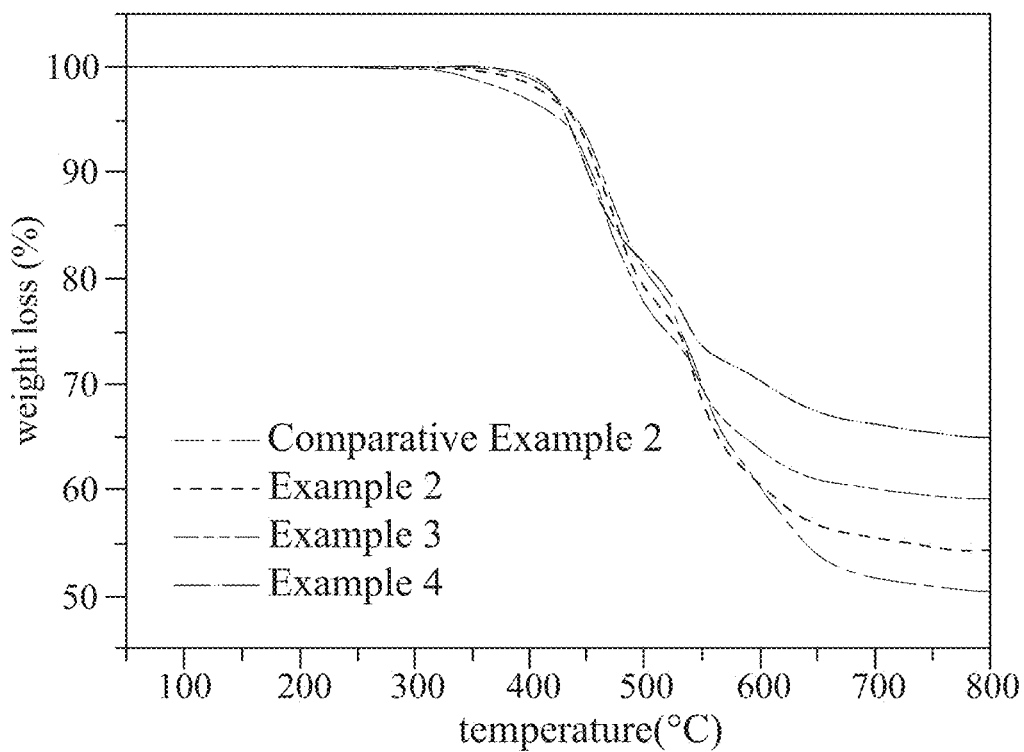
FIG. 5B is a TGA thermogram of Example 2 to Example 4 and Comparative Example 2 under nitrogen.
Figure 5C:
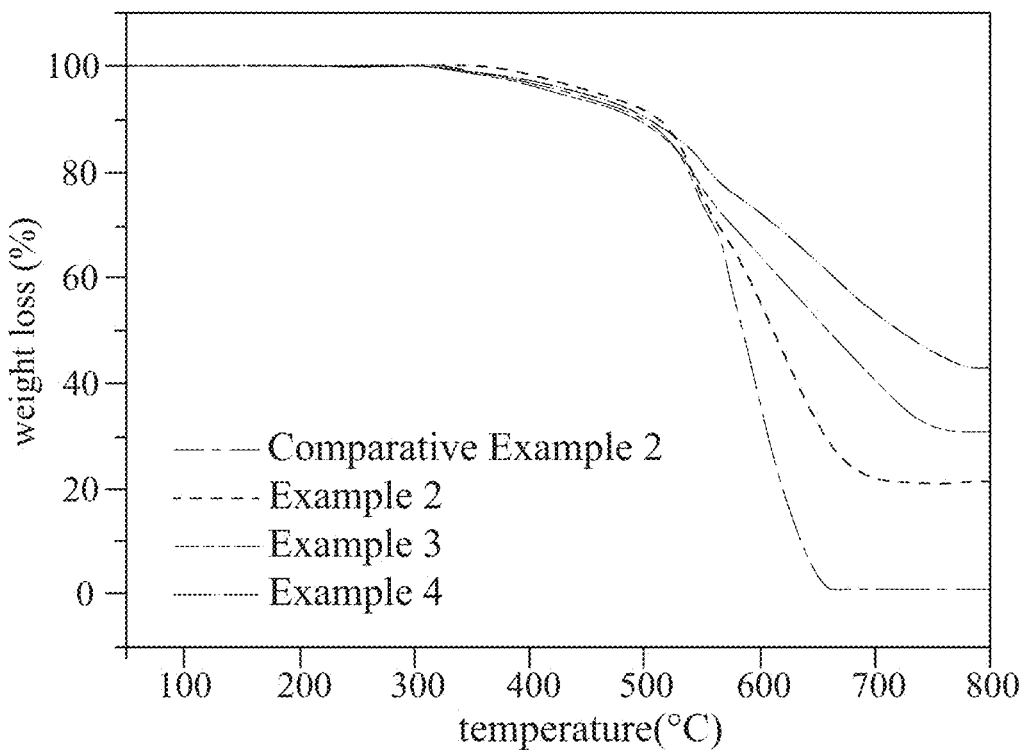
FIG. 5C is a TGA thermogram of Example 2 to Example 4 and Comparative Example 2 under air.

Please refer to FIGS. 5A, 5B and 5C. FIG. 5A is a TGA thermogram of Example 1 and Comparative Example 2. FIG. 5B is a TGA thermogram of Example 2 to Example 4 and Comparative Example 2 under nitrogen. FIG. 5C is a TGA thermogram of Example 2 to Example 4 and Comparative Example 2 under air.

The thermal cracking temperature ($T_d$) of Example 1 to Example 4 and Comparative Example 2 are known by TGA analysis. The measurement results are shown in Table 3.

TABLE 3

|  | $T_d$ (° C.) | |
| --- | --- | --- |
|  | nitrogen | air |
| Example 1 | 235 | — |
| Example 2 | 437 | 447 |
| Example 3 | 427 | 423 |
| Example 4 | 433 | 440 |
| Comparative Example 2 | 439 | 430 |

Figure 6A:
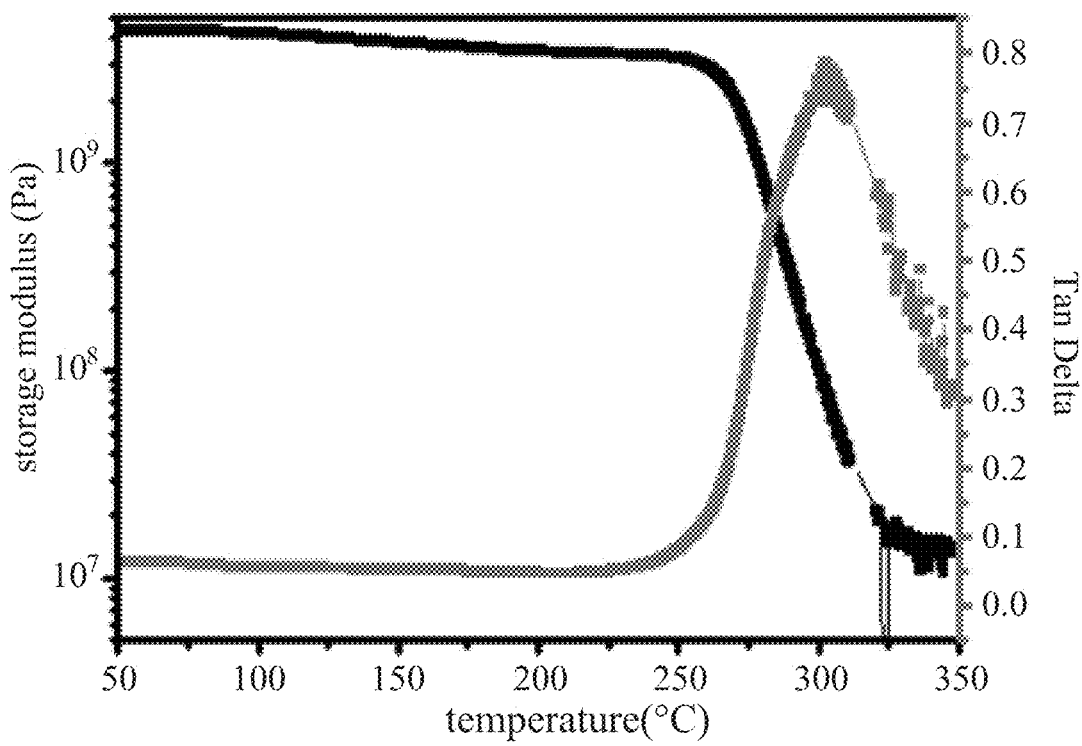
FIG. 6A is a DMA thermogram of Comparative Example 2.
Figure 6B:
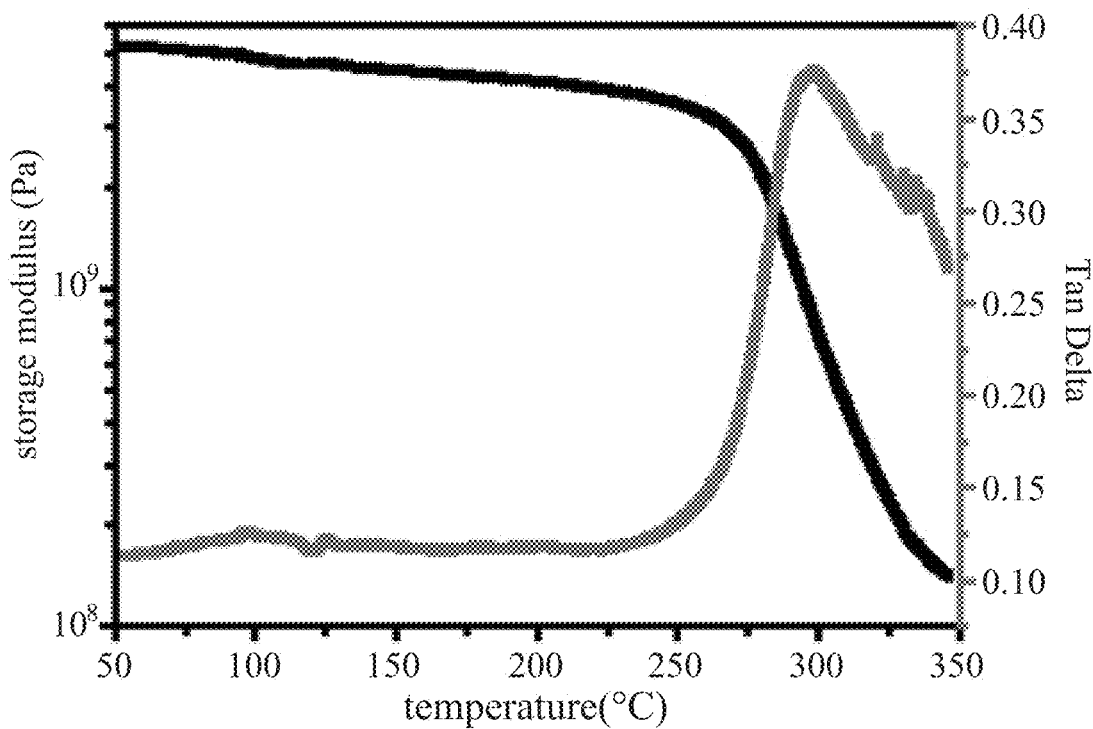
FIG. 6B is a DMA thermogram of Example 2.
Figure 6C:
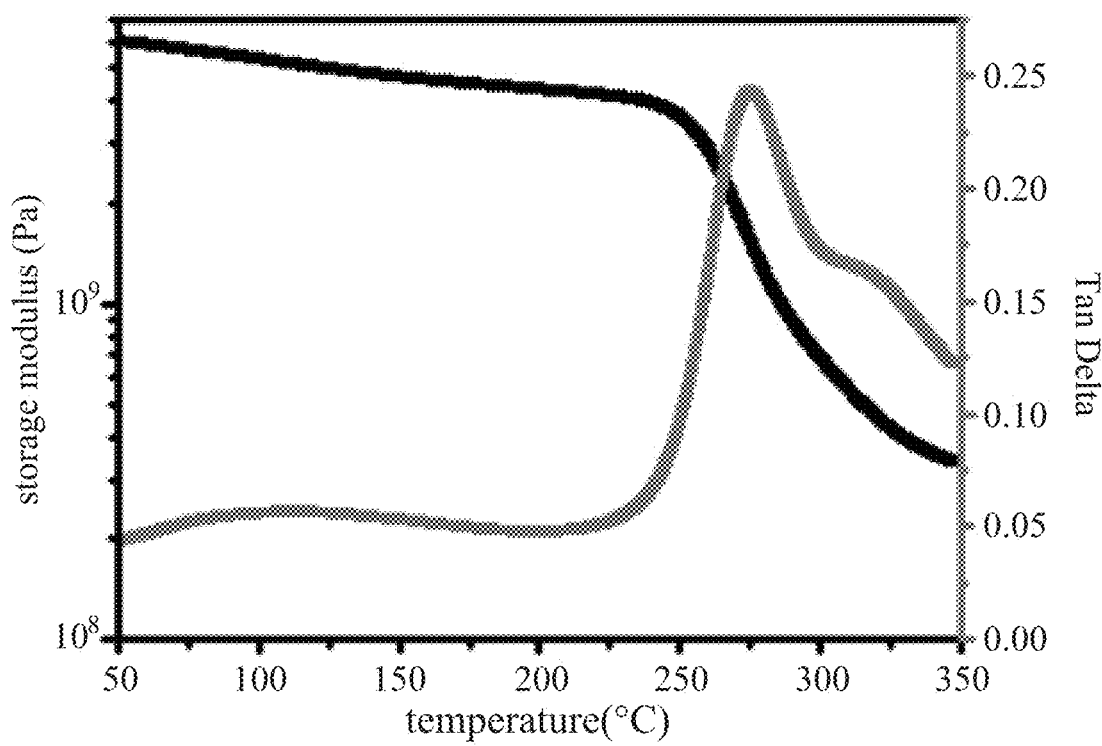
FIG. 6C is a DMA thermogram of Example 3.
Figure 6D:
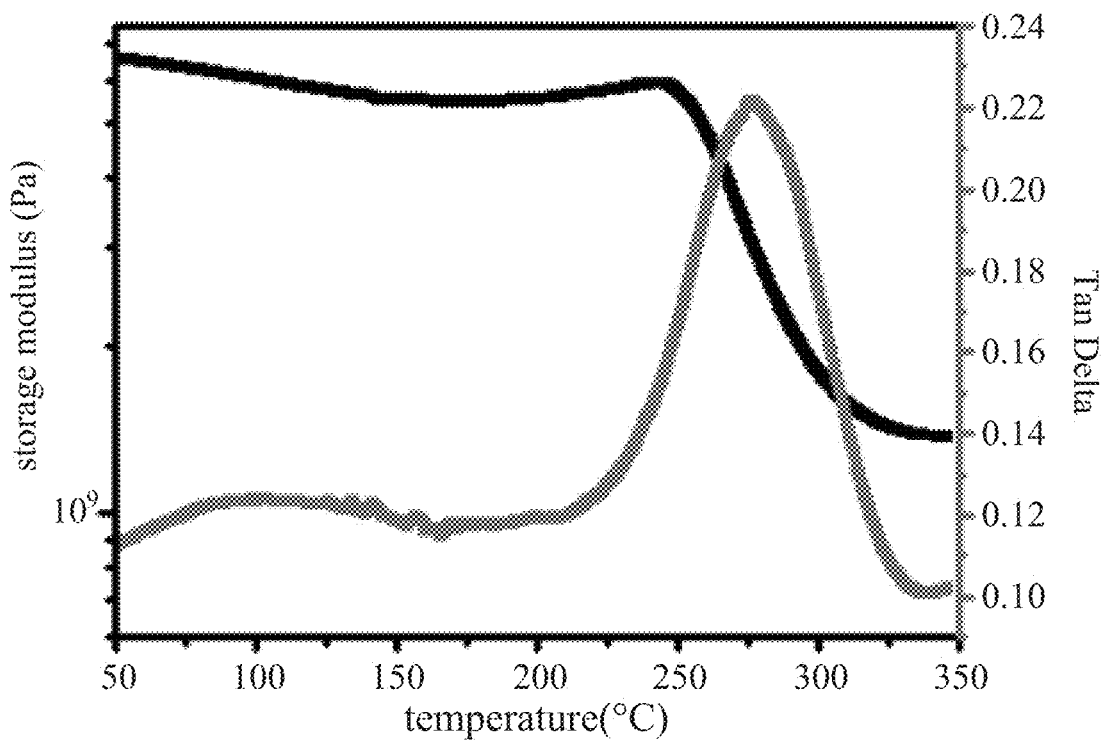
FIG. 6D is a DMA thermogram of Example 4.

Please refer to FIGS. 6A, 6B, 6C and 6D. FIG. 6A is a DMA thermogram of Comparative Example 2. FIG. 6B is a DMA thermogram of Example 2. FIG. 6C is a DMA thermogram of Example 3. FIG. 6D is a DMA thermogram of Example 4.

The glass transition temperature ($T_g$) and the storage modulus at 50° C. of Example 2 to Example 4 and Comparative Example 2 are known by DMA analysis. The measurement results are shown in Table 4.

TABLE 4

|  | Tg (° C.) | storage modulus (MPa) |
| --- | --- | --- |
| Example 2 | 298 | 5212 |
| Example 3 | 275 | 6013 |
| Example 4 | 279 | 6564 |
| Comparative Example 2 | 303 | 4358 |

Mechanical Property Measurement

Figure 7:
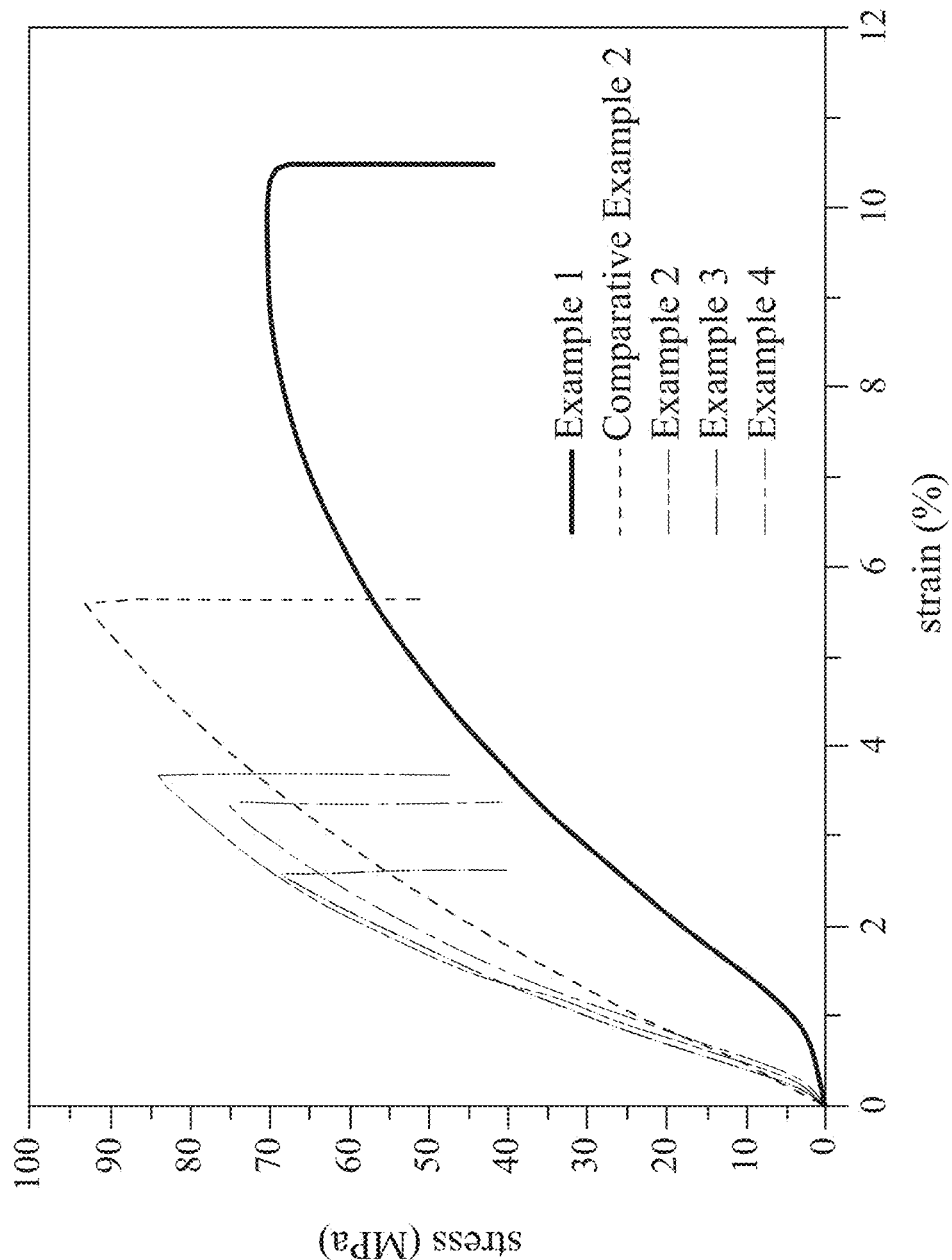
FIG. 7 is a stress-strain diagram of Example 1 to Example 4 and Comparative Example 2.

Example 1 to Example 4 and Comparative Example 2 are analyzed by the tensile strength analysis to measure the mechanical property. Please refer to FIG. 7, which is a stress-strain diagram of Example 1 to Example 4 and Comparative Example 2. The stress, the strain and the Young's modulus of Example 1 to Example 4 and Comparative Example 2 are known by tensile strength analysis. The measurement results are shown in Table 5.

TABLE 5

|  | Stress (MPa) | Strain (%) | Young's modulus (MPa) |
| --- | --- | --- | --- |
| Example 1 | 70.92 ± 3.65 | 9.81 ± 0.36 | 1871.9 ± 38.1 |
| Example 2 | 82.71 ± 1.06 | 3.86 ± 0.13 | 3647.6 ± 44.9 |
| Example 3 | 70.19 ± 1.54 | 2.52 ± 0.05 | 3483.9 ± 58.2 |
| Example 4 | 72.67 ± 2.72 | 3.26 ± 0.11 | 3194.6 ± 62.0 |
| Comparative Example 2 | 91.49 ± 2.10 | 5.41 ± 0.25 | 2467.2 ± 83.3 |

Optical Property Measurement

Figure 8:
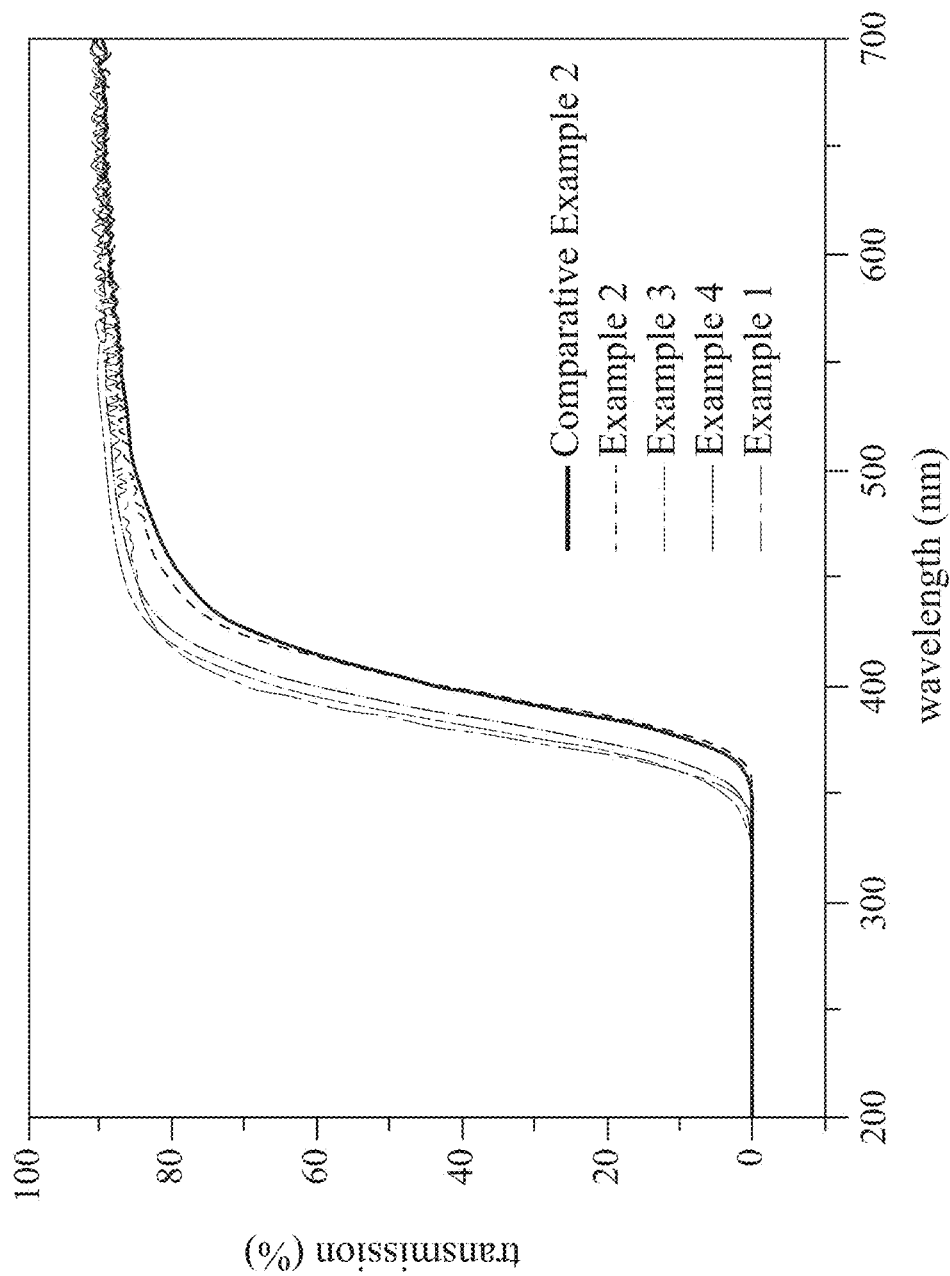
FIG. 8 is an UV spectrum of Example 1 to Example 4 and Comparative Example 2.
Figure 9:
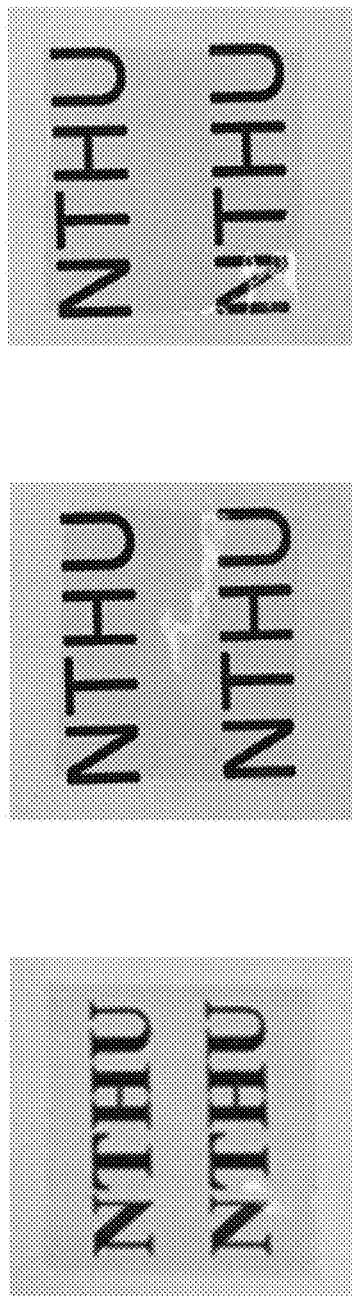
FIG. 9 is a diagram of the film of Example 1 to Example 4 and Comparative Example 2.
Figure 9:
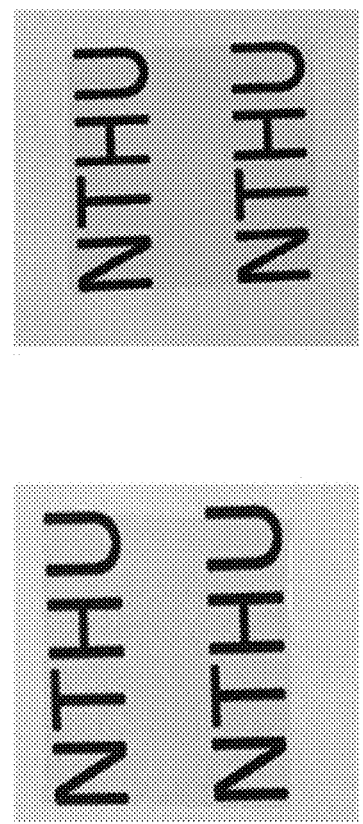

Example 1 to Example 4 and Comparative Example 2 are analyzed by the UV spectroscopy. Please refer to FIGS. 8 and 9, wherein FIG. 8 is an UV spectrum of Example 1 to Example 4 and Comparative Example 2. FIG. 9 is a diagram of the film of Example 1 to Example 4 and Comparative Example 2. The light transmittance ($T_λ$) and the cutoff wavelength (λ) of Example 1 to Example 4 and Comparative Example 2 are known by the UV spectroscopy. The measurement results are shown in Table 6.

TABLE 6

|  | $T_{400}$ (%) | $T_{450}$ (%) | $T_{500}$ (%) | λ (nm) |
|---|---|---|---|---|
| Example 1 | 69.9 | 84.7 | 87.0 | 319 |
| Example 2 | 43.8 | 80.4 | 85.9 | 353 |
| Example 3 | 65.3 | 86.6 | 88.9 | 323 |
| Example 4 | 60.4 | 84.9 | 88.0 | 328 |
| Comparative Example 2 | 44.0 | 78.5 | 84.9 | 350 |

Furthermore, the refractive index, the dielectric constant and the color parameters of Example 1 to Example 4 and Comparative Example 2 are measured, wherein the measurement results of the refractive index (RI) and the dielectric constant (ε) are shown in Table 7. The measurement results of the color parameters which includes the lightness (L*), the red-greenness (a*), the yellow-blueness (b*), yellowness (YI) and HAZE are shown in Table 8.

TABLE 7

|  | refractive index (RI) | dielectric constant (ε) |
|---|---|---|
| Example 1 | 1.57 | 2.71 |
| Example 2 | 1.56 | 2.68 |
| Example 3 | 1.53 | 2.61 |
| Example 4 | 1.54 | 2.71 |
| Comparative Example 2 | 1.59 | 2.78 |

TABLE 8

|  | L* | a* | b* | YI | HAZE |
|---|---|---|---|---|---|
| Example 1 | 95.28 | −0.74 | 2.99 | 5.08 | 0.71 |
| Example 2 | 94.73 | −1.10 | 5.43 | 9.36 | 0.92 |
| Example 3 | 95.66 | −0.38 | 2.84 | 5.01 | 0.86 |
| Example 4 | 95.13 | −1.12 | 5.59 | 9.59 | 0.74 |
| Comparative Example 2 | 95.01 | −1.17 | 4.97 | 8.44 | 1.64 |

As known in the above analysis results of the thermal property, the mechanical property and the optical property, the polyimide film of the present disclosure doped with silica has the characteristics of the thermal stability, the strong mechanical and the high light transmittance compared with the polyimide film without doped the silica. Furthermore, the yellowness of Example 3 is less than 6.0, which has the high transparency in the visible light region.

In conclusion, the polyimide polymer of the present disclosure introduces the chemically reactive groups to make it has the characteristics of the post-crosslinking reaction and post-functionalization reaction. In addition to the characteristics of the thermal stability, the strong mechanical and the high light transmittance, the polyimide film prepared after the modification of the polyimide polymer and the silica also has the high transparency in the visible light region, so that can applied for the field of the flexible printed circuit board and the colorless polyimide.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A polyimide polymer, comprising a repeating unit represented by formula (I):

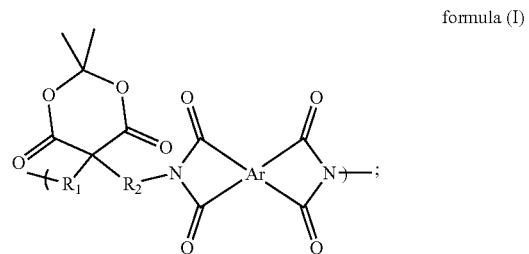

formula (I)

wherein $R_1$ and $R_2$ are the same or different from each other, and are each independently an ether group, an ester group, an amine group or other heteroatom chains, an alkyl group, an alkenyl group, an alkynyl group, an aryl group or other carbon chains, Ar is a tetravalent organic group containing aromatic ring.

2. The polyimide polymer of claim 1, wherein in the formula (I), $R_1$ and $R_2$ are benzyl groups.

3. The polyimide polymer of claim 1, wherein in the formula (I), Ar is a structure represented by formula (i), formula (ii) or formula (iii):

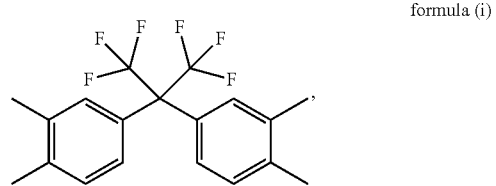

formula (i)

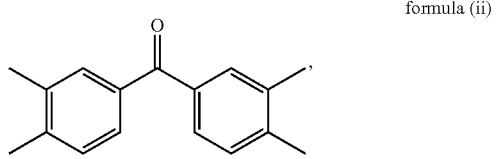

formula (ii)

formula (iii)

4. The polyimide polymer of claim 1, wherein after the polyimide polymer is heated, the polyimide polymer performs a self-crosslinking reaction.

5. A polyimide mixture, comprising:
a polyimide precursor, wherein a polyimide polymer is dissolved in a first organic solvent to obtain the polyimide precursor, and the polyimide polymer comprises a repeating unit represented by formula (I):

formula (I)

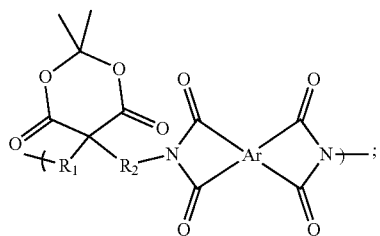

wherein R₁ and R₂ are the same or different from each other, and are each independently an ether group, an ester group, an amine group or other heteroatom chains, an alkyl group, an alkenyl group, an alkynyl group, an aryl group or other carbon chains, Ar is a tetravalent organic group containing aromatic ring; and a silica containing solution, wherein a plurality of silica particles are dispersed in a second organic solvent to obtain the silica containing solution.

6. The polyimide mixture of claim 5, wherein in the formula (I), R₁ and R₂ are benzyl groups.

7. The polyimide mixture of claim 5, wherein in the formula (I), Ar is a structure represented by formula (i), formula (ii) or formula (iii):

formula (i)

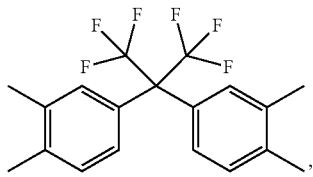

formula (ii)

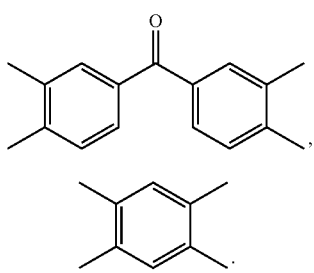

formula (iii)

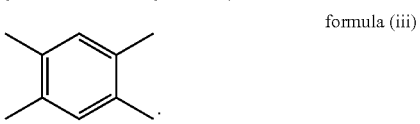

8. The polyimide mixture of claim 5, wherein the first organic solvent is N,N-dimethylacetamide, N,N-dimethylformamide, N-methyl-2-pyrrolidone or N,N-diethylacetamide.

9. The polyimide mixture of claim 5, wherein the second organic solvent is selected from alcohols, ketones, ethers, esters or mixture thereof.

10. The polyimide mixture of claim 5, wherein based on a total weight of the polyimide polymer and the silica particles, a content of the silica particles is greater than 0 wt % and less than or equal to 40 wt %.

11. The polyimide mixture of claim 5, wherein after the polyimide mixture is heated, the polyimide mixture performs a self-crosslinking reaction.

12. A polyimide film obtained by coating the polyimide mixture of claim 5 on a substrate and calcining.

13. The polyimide film of claim 12, wherein a yellowness of the polyimide film is less than 6.0.

* * * * *